United States Patent
Razeghi

(10) Patent No.: US 12,496,787 B2
(45) Date of Patent: Dec. 16, 2025

(54) ALTERNATIVE PRIMER APPLICATION METHOD

(71) Applicant: BLADE DYNAMICS LIMITED, Eastleigh (GB)

(72) Inventor: Rama Razeghi, Eastleigh (GB)

(73) Assignee: BLADE DYNAMICS LIMITED, Eastleigh (GB)

(*) Notice: Subject to any disclaimer, the term of this patent is extended or adjusted under 35 U.S.C. 154(b) by 266 days.

(21) Appl. No.: 17/904,624

(22) PCT Filed: Apr. 22, 2020

(86) PCT No.: PCT/EP2020/061234
§ 371 (c)(1),
(2) Date: Aug. 19, 2022

(87) PCT Pub. No.: WO2021/213651
PCT Pub. Date: Oct. 28, 2021

(65) Prior Publication Data
US 2023/0119338 A1 Apr. 20, 2023

(51) Int. Cl.
*B29C 70/86* (2006.01)
*B29C 70/48* (2006.01)
(Continued)

(52) U.S. Cl.
CPC ............ *B29C 70/865* (2013.01); *B29C 70/48* (2013.01); *B29C 70/547* (2013.01);
(Continued)

(58) Field of Classification Search
CPC ..... B29C 70/682; B29C 70/84; B29C 70/868; B29C 70/48; B29C 70/865; B29C 70/547;
(Continued)

(56) References Cited

U.S. PATENT DOCUMENTS

| 5,536,583 A | * | 7/1996 | Roberts | .................. C08K 3/013 |
| | | | | 428/626 |
| 11,371,482 B2 | * | 6/2022 | Hancock | ............... B29C 70/865 |
| | | (Continued) | | |

FOREIGN PATENT DOCUMENTS

| EP | 3124785 A1 | 2/2017 |
| EP | 3418556 A1 | 12/2018 |
| | (Continued) | |

OTHER PUBLICATIONS

"Product Data Sheet: SIKA215®". (Year: 2024).*
International Search Report issued on Oct. 22, 2020 for application No. PCT/EP2020/061234.

*Primary Examiner* — Michael A Tolin
*Assistant Examiner* — Hana C Page
(74) *Attorney, Agent, or Firm* — Nath, Goldberg & Meyer; Jerald L. Meyer; Tanya E. Harkins

(57) ABSTRACT

The present invention relates to a method of manufacturing a blade shell member for a wind turbine blade. The method comprising providing a blade mould for the blade shell member and arranging a number of fibre-reinforced layers on a blade moulding surface of the blade mould. A first primer layer is applied on top of the fibre-reinforced layers, at a pre-determined spar cap region. Furthermore, a pre-manufactured spar cap having an upper surface, a lower surface, a first side surface, a second side surface, a first end surface and a second end surface is arranged in the pre-manufactured spar cap on the spar cap region, such that the lower surface of the pre-manufactured spar cap contacts the first primer layer arranged on the spar cap region. A second primer layer is also applied to the upper surface of the pre-manufactured spar cap before the step of infusing the blade moulding cavity with resin and curing it. The present invention further relates to a method of manufacturing a wind turbine blade, comprising the steps of manufacturing a (Continued)

Figure 1:
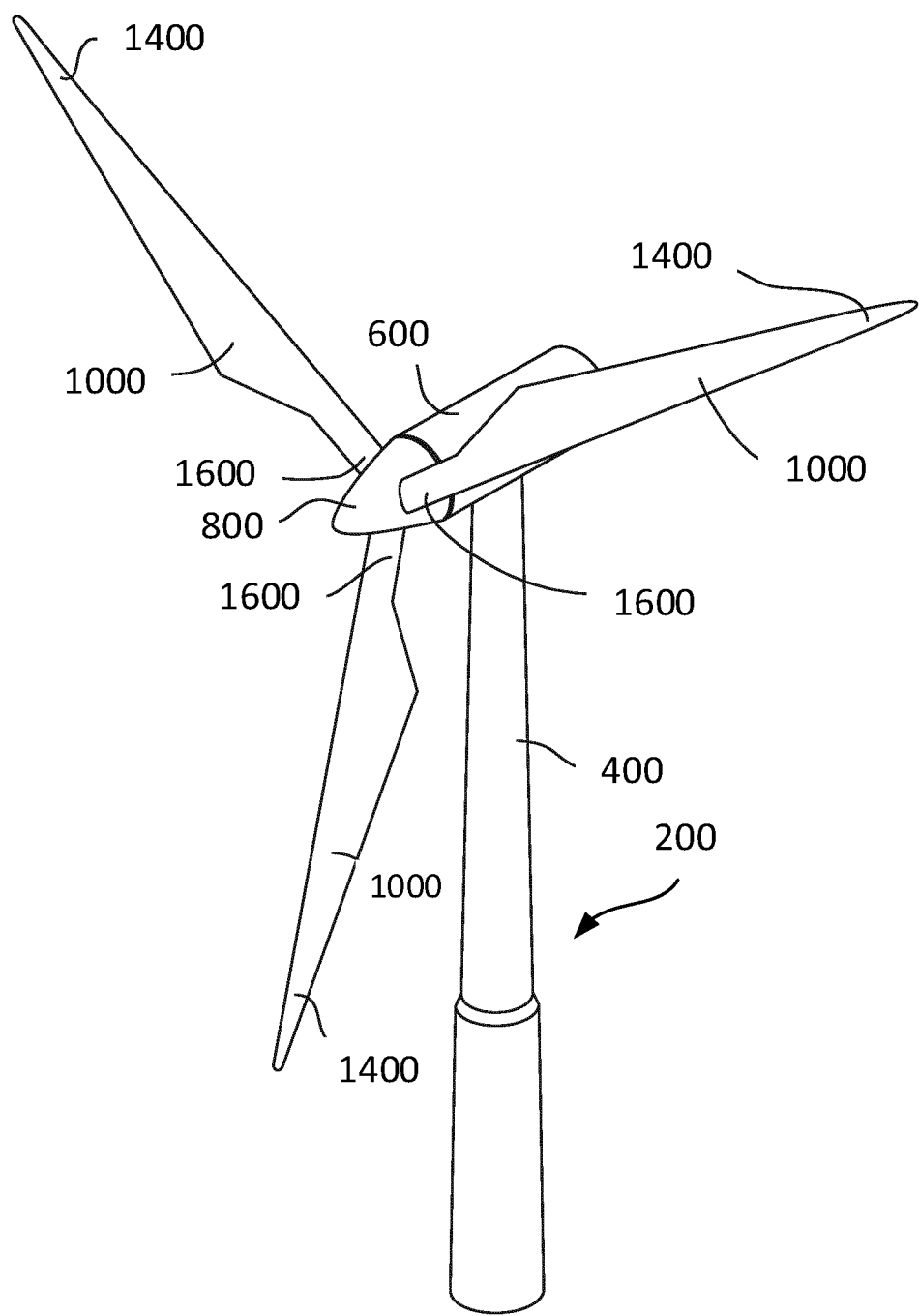

pressure side shell half and a suction side shell half over substantially the entire length of the wind turbine blade and subsequently closing and joining the shell halves for obtaining a closed shell.

20 Claims, 8 Drawing Sheets

(51) Int. Cl.
    *B29C 70/54*     (2006.01)
    *B29C 70/68*     (2006.01)
    *B29C 70/84*     (2006.01)
    *B29K 307/04*     (2006.01)
    *B29L 31/08*     (2006.01)

(52) U.S. Cl.
    CPC .......... *B29C 70/682* (2013.01); *B29C 70/683* (2013.01); *B29C 70/84* (2013.01); *B29K 2307/04* (2013.01); *B29L 2031/085* (2013.01)

(58) Field of Classification Search
    CPC .............. B29C 70/683; B29D 99/0025; B29D 99/0028
    See application file for complete search history.

(56) References Cited

U.S. PATENT DOCUMENTS

| | | | |
|---|---|---|---|
| 11,592,001 B2* | 2/2023 | Lund-Laverick | B29C 70/547 |
| 2010/0135815 A1* | 6/2010 | Bagepalli | F03D 1/0675 416/241 R |
| 2014/0271217 A1* | 9/2014 | Baker | F03D 1/0633 416/226 |
| 2015/0308404 A1* | 10/2015 | Dahl | F03D 13/10 156/60 |
| 2016/0263844 A1* | 9/2016 | Smith | B29C 70/20 |
| 2016/0341178 A1* | 11/2016 | Jorgensen | B29C 70/304 |
| 2017/0268479 A1 | 9/2017 | Caruso et al. | |
| 2019/0195202 A1* | 6/2019 | Kirkegaard | B29C 66/532 |

FOREIGN PATENT DOCUMENTS

| | | | | |
|---|---|---|---|---|
| EP | 3427931 A1 | 1/2019 | | |
| WO | 2014096002 A2 | 6/2014 | | |
| WO | 2015114098 A1 | 8/2015 | | |
| WO | 2015114100 A1 | 8/2015 | | |
| WO | 2017220740 A1 | 12/2017 | | |
| WO | WO-2017216155 A1 * | 12/2017 | .......... | B29C 70/547 |

* cited by examiner

ALTERNATIVE PRIMER APPLICATION METHOD

This is a National Phase Application filed under 35 U.S.C. 371 as a national stage of PCT/EP2020/061234, filed Apr. 22, 2020, the contents of which are hereby incorporated by reference in its entirety.

FIELD OF INVENTION

The present invention relates to a method of manufacturing a blade shell member comprising a spar cap for a wind turbine blade. Specifically, the present invention relates to a method of applying primer during manufacturing of a blade shell member comprising a spar cap for a wind turbine blade.

BACKGROUND OF THE INVENTION

The blades of modern wind turbines capture kinetic wind energy by using sophisticated blade design created to maximise efficiency. A major trend in wind turbine development is the increase in size to reduce the leveraged cost of energy. There is an increasing demand for large wind blades which may exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between the two sides. The resulting lift force generates torque for producing electricity.

The shell halves of wind turbine blades are usually manufactured using blade moulds. First, a blade gel coat or primer is applied to the mould. Subsequently, fibre reinforcement material is placed into the mould in layers followed by arrangement of other elements within the shell halves, such as core elements, load-carrying spar caps, internal shear webs and the like. The resulting shell halves are resin infused and assembled by being glued or bolted together substantially along a chord plane of the blade.

The spar caps comprise a plurality of carbon pultrusion elements and interlayers arranged between the carbon pultrusion elements. The spar caps may be produced directly in the wind turbine blade moulds or in a separate offline mould where they are resin infused and then subsequently lifted into the main blade shell mould which is then infused with resin.

Different combinations of resins may be used for the spar cap and the main blade shell. It is very important to ensure a sufficiently strong adhesion between the shell and the pre-manufactured spar cap, since bonding of resin onto the pre-cast main spar is crucial for the structural integrity of the blade. Vinyl ester or epoxy ester resins have good adherence properties and are often used, whereas other resins, such as polyester resin, have an attractive price. However, the adhesion properties of polyester resin are low compared to vinyl ester and epoxy resin.

The use of a primer on the spar cap increase the adherence properties at the resin interface. Although the primer enhances the adhesion, it is not easy to apply and control.

Where the spar cap is made offline, primer may be applied to all surfaces of the spar cap before it is placed in the blade mould. However, to apply primer to all surfaces of the pre-manufactured main spar before it is placed in the blade mould is challenging for several reasons. In practice, it is especially hard to apply the primer on the bottom of the pre-manufactured spar cap since the spar cap needs to be turned upside down to be able to apply primer to the bottom surface. Secondly, the spar cap needs to be lifted onto the blade mould after appliance of primer. To lift the spar cap, a sling may be arranged around the spar cap. However, the sling may damage some of the primed surfaces during lifting and thus decrease the adherence and strength of the finished structure. Furthermore, the primer may be based on isocyanate chemistry and react with moisture. Thus, its effect is reduced over time, especially at high humidities. Thus, the time from appliance of the first primer layer to the time of resin infusion is critical, and a prolonged processing time may affect the primer properties and the structural integrity of the blade.

Hence, improved methods to ensure a sufficiently strong adhesion between the shell and the pre-manufactured spar cap at a reduced cost would be advantageous.

OBJECT OF DISCLOSURE

Thus, an object of the present invention is to provide an improved method of manufacturing a blade shell member comprising a spar cap. It is a further object of the present invention to provide a method of manufacturing a blade shell member having sufficiently strong adhesion between the shell and the pre-manufactured spar cap at a reduced cost.

SUMMARY OF DISCLOSURE

The present inventors have found that one or more of said objects may be achieved in a first aspect of the invention relating to a method of manufacturing a blade shell member for a wind turbine blade, the method comprising the steps of:
  providing a blade mould for the blade shell member, the blade mould comprising a moulding surface and a moulding cavity;
  arranging a number of fibre-reinforced layers on the blade moulding surface;
  applying a first primer layer on top of the fibre-reinforced layers, at a pre-determined spar cap region;
  providing a pre-manufactured spar cap having an upper surface, a lower surface, a first side surface, a second side surface, a first end surface and a second end surface;
  arranging the pre-manufactured spar cap on the spar cap region, such that the lower surface of the pre-manufactured spar cap contacts the first primer layer arranged on the spar cap region;
  infusing the blade moulding cavity with resin;
  curing the resin to form the blade shell member; and
  applying a second primer layer to the upper surface of the pre-manufactured spar cap before infusing the blade moulding cavity with resin.

By applying the first primer layer on top of the fibre-reinforced layers at the predetermined spar cap region, before arranging the pre-manufactured spar cap in the blade mould, appliance of primer on the bottom of the pre-manufactured spar cap can be avoided. In this way, it is not necessary to turn the spar cap upside down to be able to apply the first primer layer to the bottom surface. Furthermore, damage to the first primer layer during lifting of the pre-manufactured spar cap from a preparation station to the blade mould is avoided. In this way, improved adherence properties and strength of the finished structure can be obtained. Finally, the time from appliance of the first primer layer to the time of resin infusion can be reduced. For example, appliance of the second primer layer to the upper surface of the pre-manufactured spar cap may be performed simultaneously with appliance of the first primer layer to the spar cap region, and the pre-manufactured spar cap may be arranged on the blade mould immediately after primer appliance, hereby decreasing manufacturing time and avoiding a reduced effect of the primer.

Recent testing shows that the fracture toughness at the interface between pre-cast vinyl ester laminate and polyester laminate is low. However, the use of a primer on the pre-manufactured vinyl ester spar cap can increase the fracture toughness at the vinyl ester/polyester resin interface. With the improved method of the present invention, a wind turbine shell member with an offline spar cap mould may be infused with vinyl ester or epoxy ester, whereas the main wind turbine blade mould may be infused with polyester infusion resin. The resultant wind turbine shell member has a sufficiently strong adhesion between the shell and the pre-manufactured spar cap at a reduced cost.

The method of the present invention is for providing a blade shell member, such as a suction side shell member or a pressure side shell member. It is to be understood that the same method may be used for providing a suction side shell member as well as a pressure side shell member. The only difference between providing the pressure side shell member and the suction side shell member would be the shape of the blade mould.

The method of the present invention is for manufacturing a blade shell member comprising a pre-manufactured spar cap. The pre-manufactured spar cap is preferably an elongated element having an upper surface, a lower surface, a first side surface, a second side surface, a first end surface and a second end surface.

The upper surface and lower surface are preferably arranged opposite each other and may have substantially the same size. In the same way, the first and second side surfaces may be arranged opposite each other and have substantially the same sizes, and the first and second end surfaces are arranged opposite each other and preferably have substantially the same sizes. However, since the shape of the spar cap is set according to strength requirements, the thickness may change along the longitudinal direction of the spar cap, resulting in tapering sections at the sides and/or the ends.

In some embodiments, the step of providing the pre-manufactured spar cap comprises the steps of:
  providing a plurality of pultruded carbon planks and a number of interlayers comprising fibre material for promoting resin flow between the pultruded carbon planks;
  arranging the plurality of pultruded carbon planks in a stacked array, wherein the plurality of pultrusion layers are separated by the number of interlayers; and
  infusing and optionally curing the plurality of pultruded carbon elements with resin.

The pultruded carbon planks are preferably elongated elements with a rectangular cross-section and made from carbon fibres in a cured resin. Alternatively, they may be hybrid pultrusion elements comprising a second type of reinforcement fibres, such as glass fibres. The interlayers comprise fibre material, such as glass fibres or polymeric fibres etc. for promoting resin flow between the pultruded carbon planks.

In some embodiments, the pre-manufactured spar cap is infused with vinyl ester or epoxy ester resin to connect the pultruded elements. The adherence properties and strength of the pre-manufactured spar cap is very important. Thus, even though the price of vinyl ester or epoxy ester are high compared to other resins, these are preferred for the pre-manufactured spar cap. However, other resins, such as polyester resin may be used as well.

In some embodiments, the step of providing the pre-manufactured spar cap further comprises the step of applying the second primer layer to the upper surface of the spar cap before arranging it in the blade mould.

In some embodiments, the step of providing the pre-manufactured spar cap further comprises the step of applying the third and/or fourth and/or fifth and/or sixth primer layer to the side and end surfaces of the spar cap before it is arranged in the blade mould.

According to the present invention, a number of fibre-reinforced layers are arranged on the blade moulding surface, before the pre-manufactured spar cap is arranged in the blade mould, on top of the fibre-reinforced layers.

In some embodiments, the number of fibre-reinforced layers comprises glass fibres and/or carbon fibres.

The number of fibre-reinforced layers may comprise unidirectional fibre layers and/or biaxial fibre layers and/or triaxial fibre layers.

The fibre-reinforced layers arranged on the blade moulding surface will become the outer shell of the blade shell member. Thus, preferably the fibre-reinforced layers should cover the entire moulding surface. The number of fibre-reinforced layers are between 1-100, preferably between 5-50, such as between 10-40.

In some embodiments, the step of arranging the number of fibre-reinforced layers on the blade moulding surface comprises arranging each of the number of fibre-reinforced layers on top of each other in the blade mould.

In some embodiments, the step of arranging the number of fibre-reinforced layers on the blade moulding surface comprises arranging a plurality of preforms, each comprising a consolidated stack of fibre-reinforced layers, on the moulding surface. Preferably, the plurality of preforms together covers the entire moulding surface. The use of preforms may be advantageous, especially when manufacturing very large blade shell members, since wrinkles in the fibre-reinforced layers may be reduced.

In accordance with the present invention, the pre-manufactured spar cap is arranged on a spar cap region, such that the lower surface of the pre-manufactured spar cap contacts the first primer layer.

The pre-manufactured spar cap region is to be understood as a region relative to the moulding surface, where the pre-manufactured spar cap is to be arranged. However, the spar cap region is not to be understood as an area of the moulding surface, since the pre-manufactured spar cap is to be arranged on the fibre-reinforced layers arranged on the moulding surface.

The spar cap region has the same size as the lower surface of the pre-manufactured spar cap. However, the primer layer is not necessarily applied to the entire spar cap region. In some embodiments, the primer layer is applied on the entire spar cap region. In some embodiments, the primer layer is applied on one or more areas of the spar cap region, but not on the entire area.

In some embodiments, the method of the present invention further comprises a step of applying a third primer layer and/or a fourth primer layer to the first side surface and/or the second side surface, respectively, and wherein the step is performed after arranging the pre-manufactured spar cap on the spar cap region, but before infusing the blade moulding cavity with resin.

In some embodiments, the method further comprises a step of applying a fifth primer layer and/or sixth primer layer to the first end surface and/or the second end surface, respectively, wherein the step is performed after arranging the pre-manufactured spar cap on the spar cap region but before infusing the blade moulding cavity with resin.

It is not essential to apply primer to the side surfaces and/or end surfaces of the pre-manufactured spar cap. However, if done, the primer layers may be applied to the pre-manufactured spar cap before or after it is arranged in the blade mould. Depending on the method of lifting the pre-manufactured spar cap from a preparation table to the blade mould, it may be advantageous to apply the primer layers after arranging the pre-manufactured spar cap in the blade mould to avoid damages to the primer layers during lifting, or to apply the primer layers before the pre-manufactured spar cap is arranged in the blade mould, such as simultaneously as applying the first primer layer, to reduce manufacturing time and avoid a reduced effect of the primer.

In some embodiments, the at least one of the first, second, third, fourth, fifth and sixth primer layer, preferably all of the primer layers, are applied by brushing and/or rolling and/or spraying.

In some embodiments, the at least one of the first, second, third, fourth, fifth and sixth primer layer, preferably all of the primer layers, are applied using a spray gun, such as a long-reach spray gun. The first primer layer may be applied from the walkway on the side of the blade mould.

This will minimise any damage to the materials in the blade mould.

In some embodiments, the primer layer is applied on the entire spar cap region.

In some embodiments, the primer layer is applied on one or more areas of the spar cap region, but not on the entire area.

The primer may be applied in the form of a powder or as a solution comprising primer.

In some embodiments, the at least one of the first, second, third, fourth, fifth and sixth primer layer, preferably all of the primer layers, comprise or consist of Sika® Primer-215, manufactured by Sika® USA.

The primer layer may be a uniform layer comprising between 25-200 ml primer/m2.

However, the primer layer may also be an uneven layer, where some parts of the spar cap region comprise primer and other parts comprise less primer or no primer at all.

In some embodiments, the method according to the present invention further comprises the step of arranging further elements, such as sandwich core layers and/or further fibre-reinforced layers in the blade mould before the blade mould cavity is infused with resin.

According to the method of the present invention, the blade moulding cavity is infused with resin and cured to form the blade shell member.

In some embodiments, the step of infusing the blade mould cavity with resin is based on vacuum-assisted resin transfer moulding (VARMT). When the desired elements have been arranged in the blade mould, a vacuum bag may be arranged on top of the elements arranged on the moulding surface and the vacuum bag may be sealed against the blade mould. Then, the blade mould cavity within the sealed vacuum bag may be infused with resin. Optionally, the step of resin infusion is followed by curing to obtain the finished blade shell member.

In some embodiments, the blade mould cavity is infused with polyester resin. Polyester resin is much cheaper than conventionally used resins, such as epoxy ester and vinyl ester. Due to appliance of one or more primer layers to one or more surfaces of the spar cap, sufficient adherence and strength of the blade shell member are obtained at a reduced price. However, the blade mould cavity may also be infused with other resins, such as epoxy ester or vinyl ester resins.

In a second aspect, the present invention relates to a method of manufacturing a wind turbine blade, comprising the steps of manufacturing a pressure side shell half and a suction side shell half over substantially the entire length of the wind turbine blade in accordance with the first aspect of the present invention and subsequently closing and joining the shell halves for obtaining a closed shell.

It will be understood that any of the above-described features may be combined in any embodiment of the invention. In particular, embodiments described with regard to the method of manufacturing a blade shell member may also apply to the method of manufacturing a wind turbine blade or a wind turbine and vice versa.

DETAILED DESCRIPTION OF THE INVENTION

Figure 2:
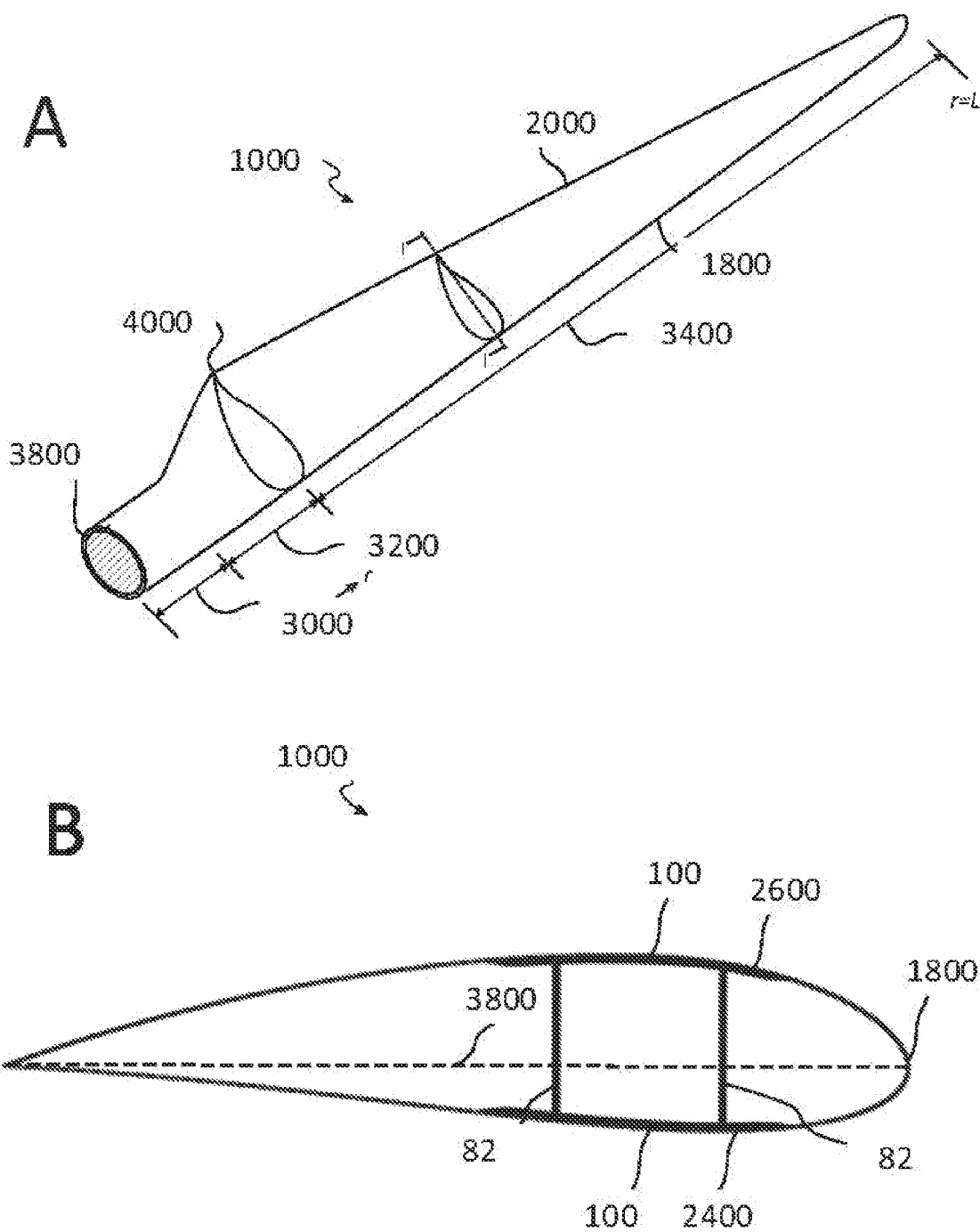
Figure 3:
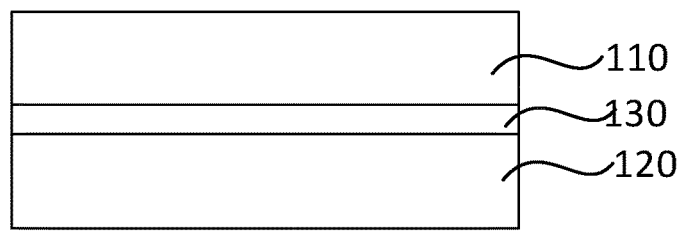
Figure 3:
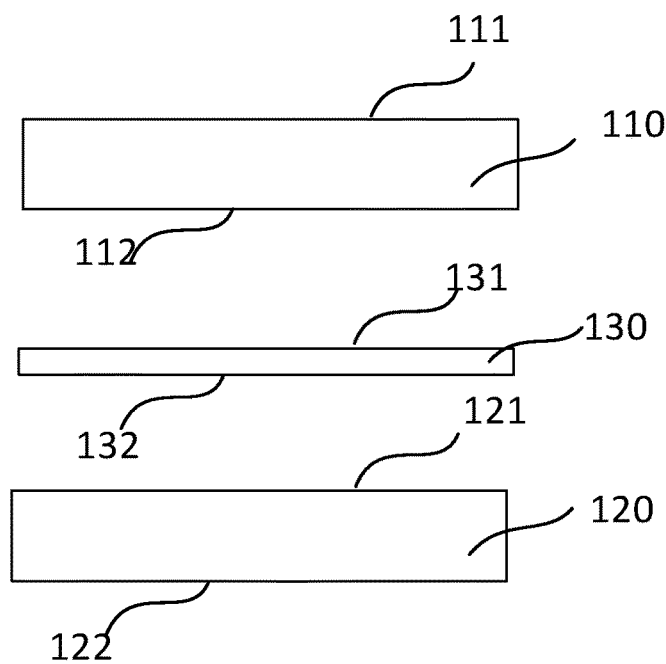
Figure 3:
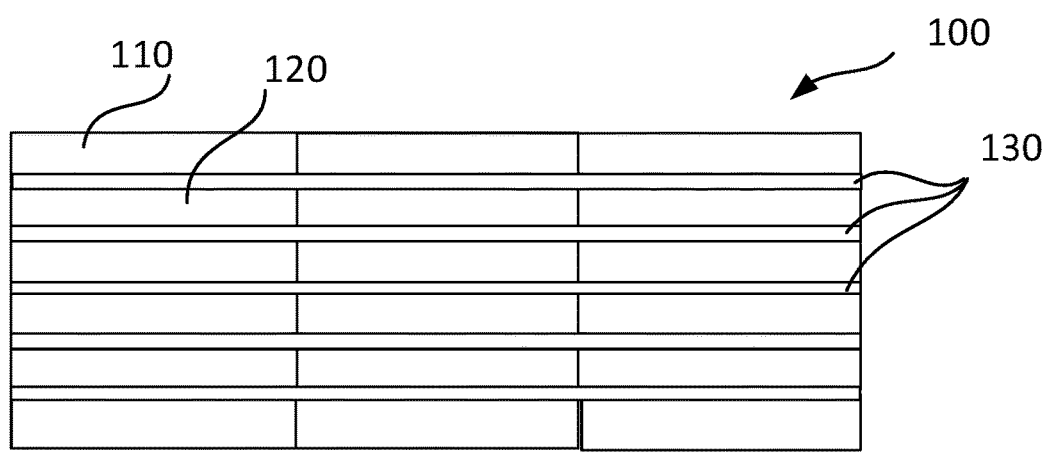
Figure 4:
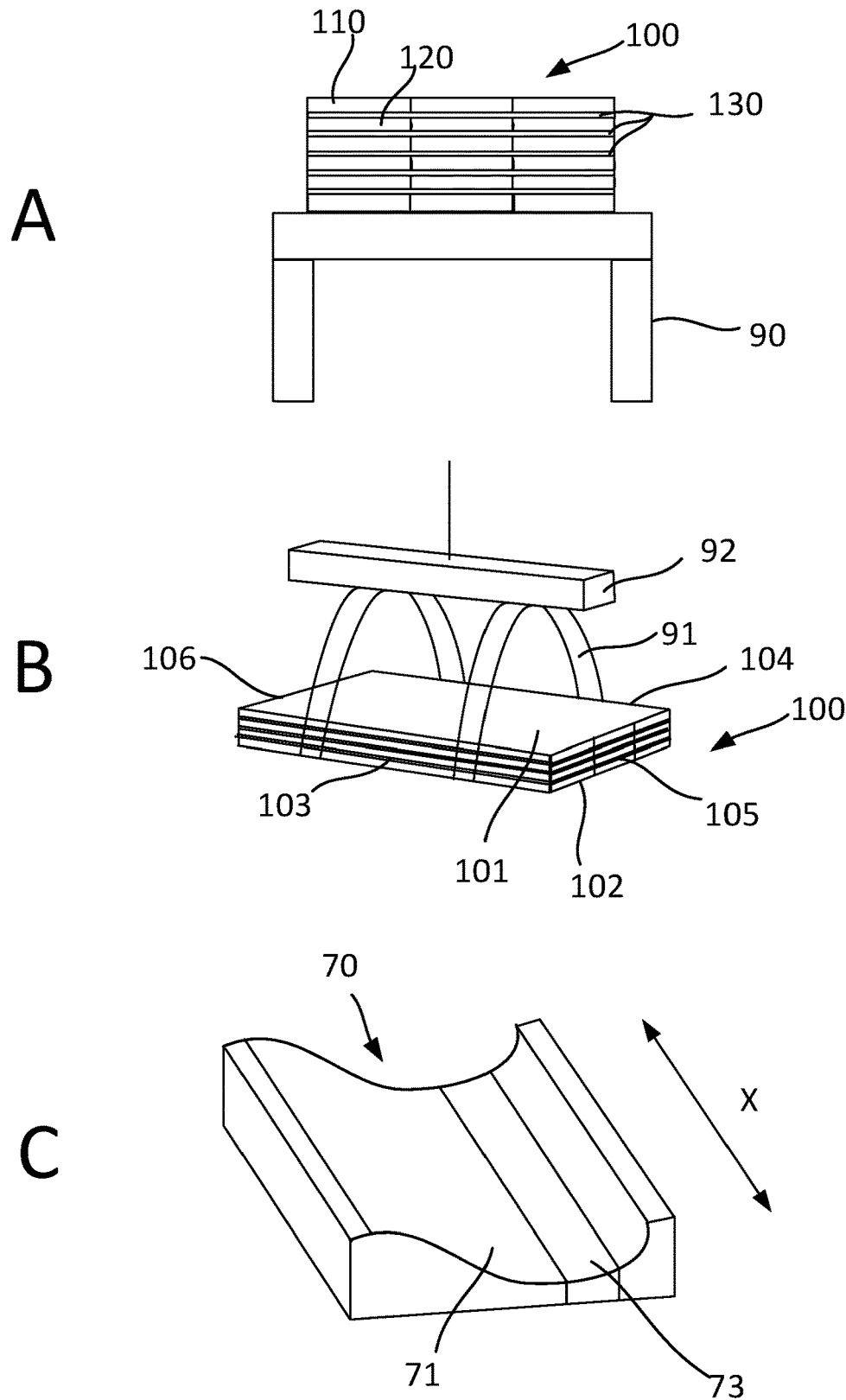
Figure 5:
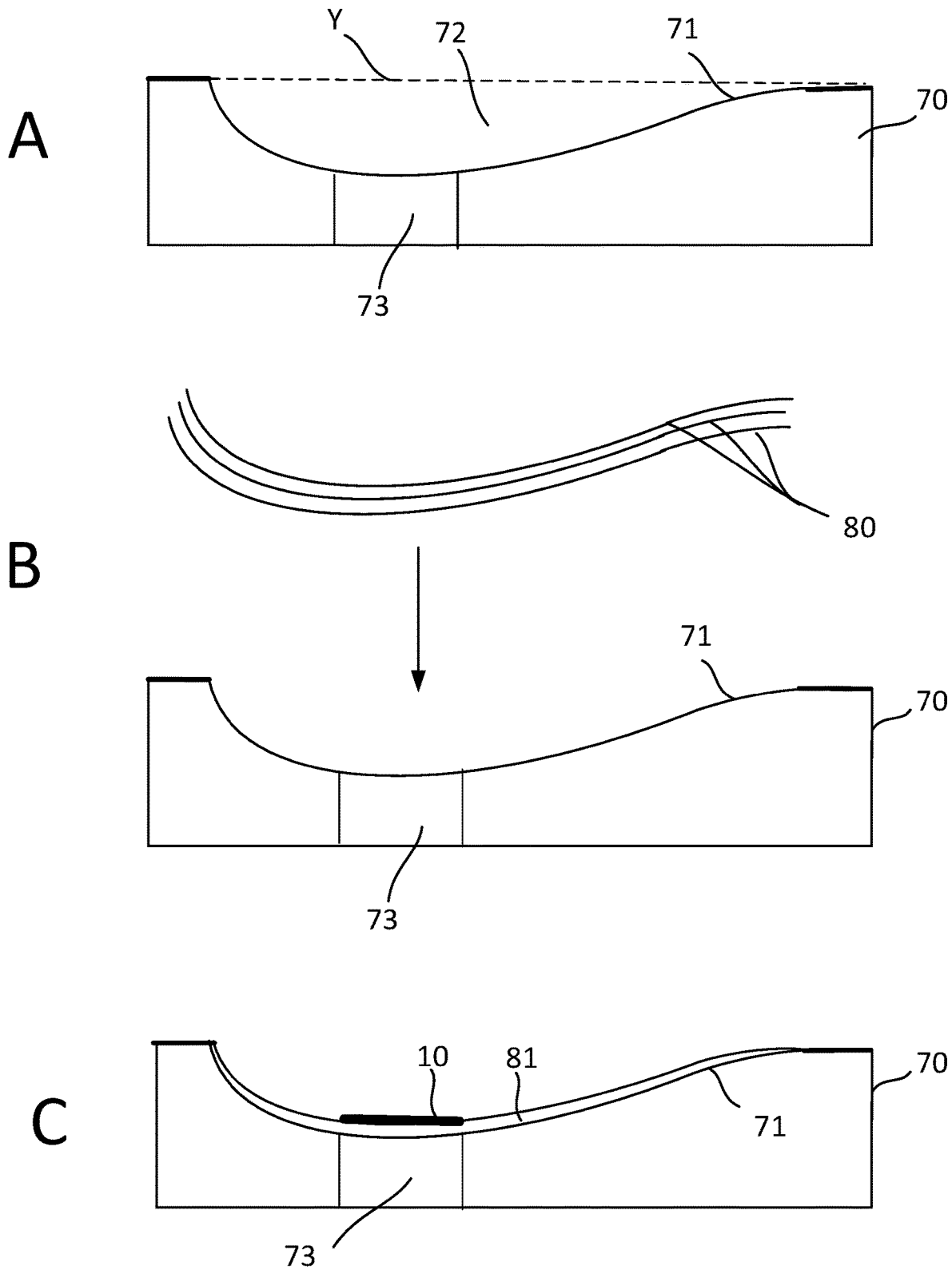
Figure 5:
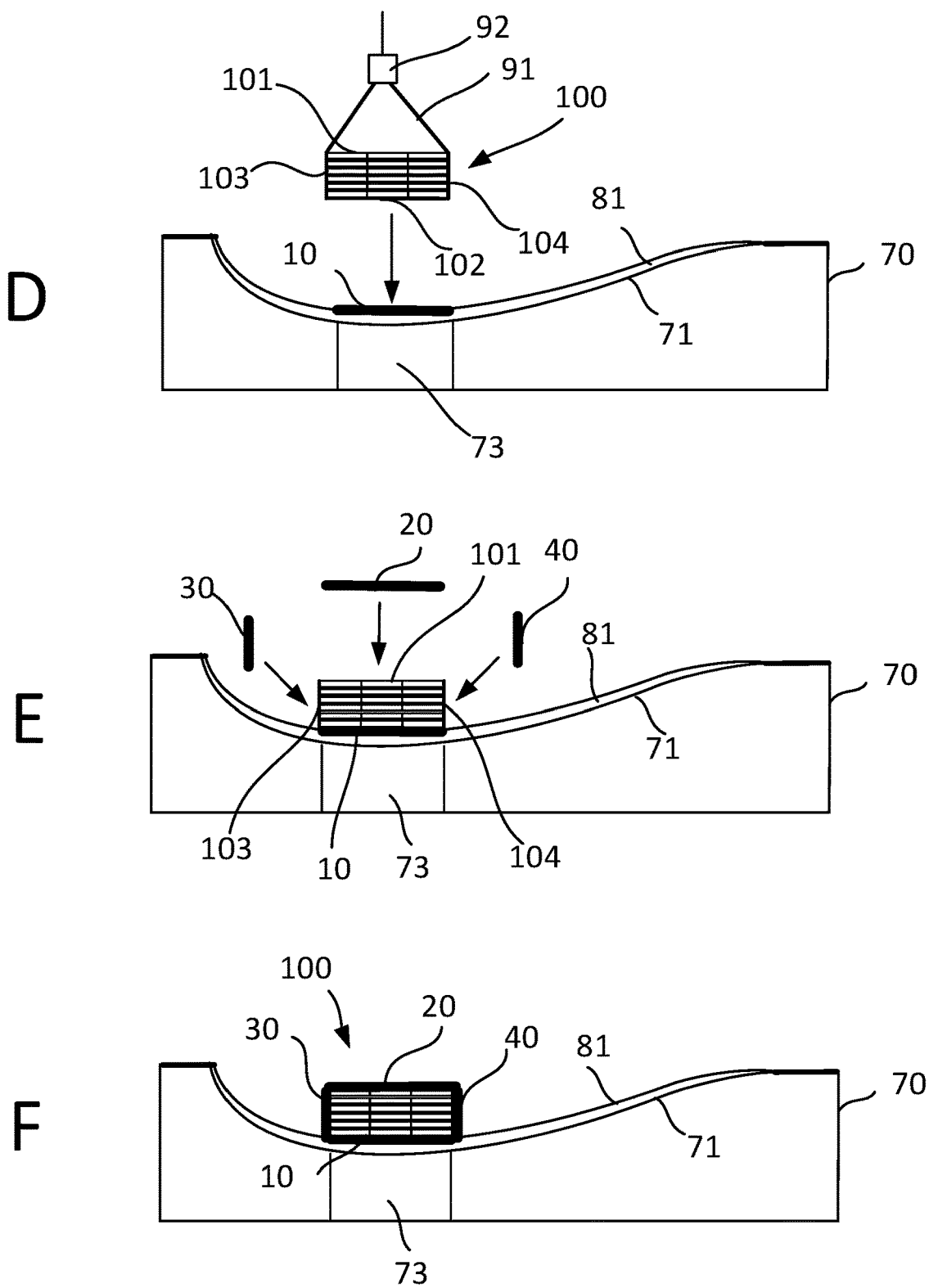
Figure 5:
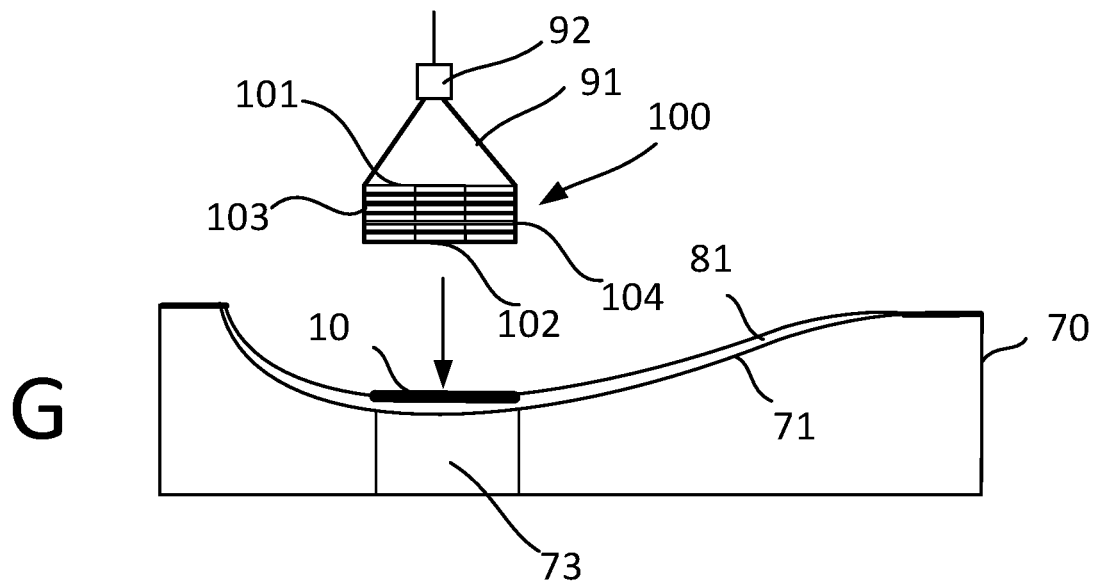
Figure 5:
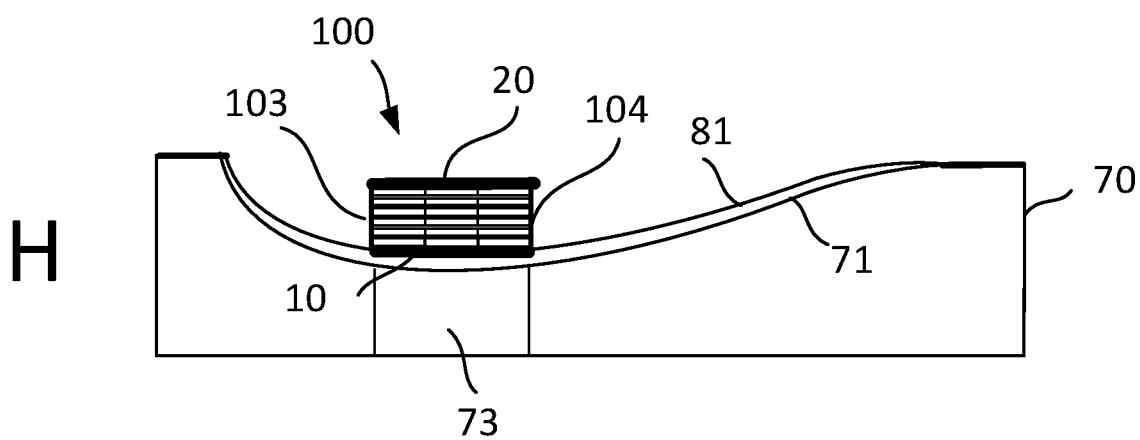
Figure 5:
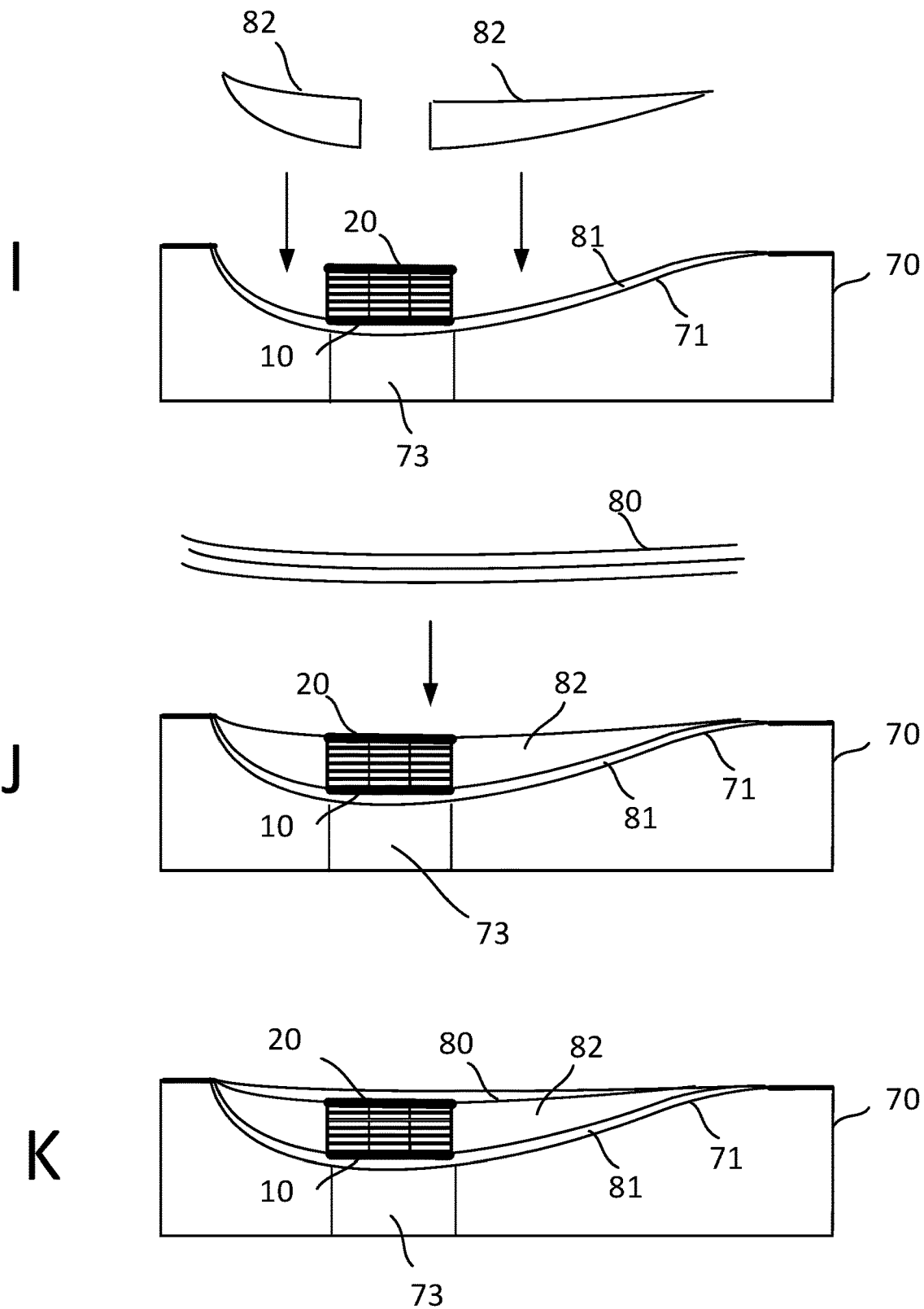

The invention is explained in detail below with reference to embodiments shown in the drawings, in which FIG. 1 is a schematic diagram illustrating a wind turbine, FIG. 2 is a schematic diagram illustrating a wind turbine blade and a spar cap structure arranged within the wind turbine blade, FIG. 3 is a schematic diagram illustrating a cross-sectional view of an interlayer arranged between carbon pultrusion elements, FIG. 4 is a schematic diagram illustrating a spar cap arranged on a preparation table, a spar cap being lifted in a sling and a three-dimensional view of part of a blade mould, and FIG. 5 is a schematic diagram illustrating a cross-sectional view of the blade mould of FIG. 4 and method steps of providing a blade shell member according to embodiments of the present invention.

DETAILED DESCRIPTION

FIG. 1 illustrates a conventional modern upwind wind turbine according to the so-called "Danish concept" with a tower 400, a nacelle 600 and a rotor with a substantially horizontal rotor shaft. The rotor includes a hub 800 and three blades 1000 extending radially from the hub 800, each having a blade root 1600 nearest the hub and a blade tip 1400 furthest from the hub 800.

FIG. 2A shows a schematic view of a first embodiment of a wind turbine blade 1000 according to the invention. The wind turbine blade 1000 has the shape of a conventional wind turbine blade and comprises a root region 3000 closest to the hub, a profiled or an airfoil region 3400 furthest away from the hub and a transition region 3200 between the root region 3000 and the airfoil region 3400. The blade 1000 comprises a leading edge 1800 facing the direction of rotation of the blade 1000, when the blade is mounted on the hub, and a trailing edge 2000 facing the opposite direction of the leading edge 1800.

The airfoil region 3400 (also called the profiled region) has an ideal or almost ideal blade shape with respect to generating lift, whereas the root region 3000 due to structural considerations has a substantially circular or elliptical cross-section, which for instance makes it easier and safer to mount the blade 1000 to the hub. The diameter (or the chord) of the root region 3000 may be constant along the entire root region 3000. The transition region 3200 has a transitional profile gradually changing from the circular or elliptical shape of the root region 3000 to the airfoil profile of the airfoil region 3400. The chord length of the transition region 3200 typically increases with increasing distance r from the hub. The airfoil region 3400 has an airfoil profile with a chord extending between the leading edge 1800 and the trailing edge 2000 of the blade 1000. The width of the chord decreases with increasing distance r from the hub.

A shoulder 4000 of the blade 1000 is defined as the position where the blade 100 has its largest chord length. The shoulder 4000 is typically provided at the boundary between the transition region 3200 and the airfoil region 3400.

It should be noted that the chords of different sections of the blade normally do not lie in a common plane since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 2B is a schematic diagram illustrating a cross-sectional view of an exemplary wind turbine blade 1000, e.g. a cross-sectional view of the airfoil region of the wind turbine blade 1000. The wind turbine blade 1000 comprises a leading edge 1800, a trailing edge 2000, a pressure side 2400, a suction side 2600, a first spar cap 100 and a second spar cap 100. The wind turbine blade 1000 comprises a chord line 3800 between the leading edge 1800 and the trailing edge 2000. The wind turbine blade 1000 comprises shear webs 82, such as a leading edge shear web and a trailing edge shear web. The shear webs 82 could alternatively be a spar box with spar sides, such as a trailing edge spar side and a leading edge spar side. The spar caps 100 may comprise carbon fibres while the rest of the shell parts 2400, 2600 may comprise glass fibres.

FIG. 3A is a schematic diagram illustrating a cross-sectional view of an interlayer 130 arranged between a first pultruded carbon element 110 and a second pultruded carbon element 120 of a fibre-reinforced composite material. The pultruded carbon elements 110, 120 and the interlayer 130 may form part of a spar cap 100 arranged in a wind turbine blade.

FIG. 3B is a schematic diagram illustrating an exploded view of the interlayer 130 arranged between the first and second pultruded carbon elements 110, 120. The interlayer 130 has an upper interlayer surface 131 and a lower interlayer surface 132. In the same way, the first pultruded carbon element 110 has a first upper carbon surface 111 and a first lower carbon surface 112, and the second pultruded carbon element 120 has a second upper carbon surface 121 and a second lower carbon surface 122. The first pultruded carbon element 110 and the second pultruded carbon element 120 are arranged such that the first lower carbon surface 112 of the first pultruded carbon element 110 is facing the second upper carbon surface 121 of the second pultruded element 120. The interlayer 130 is being arranged between the first lower surface 112 and the second upper surface 121, such that the upper interlayer surface 131 is in contact with the first lower carbon surface 112 and the lower interlayer surface 132 is in contact with the second upper carbon surface 121.

FIG. 3C is a schematic diagram illustrating a cross-sectional view of a spar cap 100 comprising a plurality of pultruded carbon elements, including a first and second pultruded carbon element 110, 120, arranged in a stacked array. The plurality of pultrusion carbon elements are separated by a number of interlayers 130. In FIG. 3C, the stacked array of pultruded carbon elements comprise three rows arranged adjacently, and each row comprises six pultruded carbon elements arranged on top of each other. Five interlayers 130 are arranged between the pultruded carbon elements arranged on top of each other, extending from the first to the third row of pultruded carbon elements.

FIG. 4A is a schematic diagram illustrating a side view of an offline, i.e. pre-manufactured, spar cap 100 arranged on a preparation table 90, where a first end surface of the spar cap can be seen.

FIG. 4B is a schematic diagram illustrating a three-dimensional view of the pre-manufactured spar cap 100 arranged in a sling 91 which is further coupled to a beam 92, wherein a first side surface 103, a first end surface 105 and an upper surface 101 of the spar cap 100 are visible. The spar cap 100 further comprises a lower surface 102, a first side surface 104 and a second end surface 106.

The sling 91 is an example of an element for lifting the spar cap 100 from the preparation table 90 to the blade mould 70. As can be seen, the sling 91 is arranged around the spar cap 100 and thus contacts the lower surface 102 of the spar cap 100, as well as the first and second side surfaces 103, 104 of the spar cap 100. This means that if a primer layer is applied to the lower surface 102 and/or side surfaces 103, 104 of the spar cap, the lifting of the spar cap from the preparation table 90 to the blade mould 70 may damage the applied primer layers.

FIG. 4C is a schematic diagram illustrating a three-dimensional view of a part of a blade mould 70 for moulding a blade shell member, such as a suction side blade shell member or a pressure side blade shell member. Only a middle part of the blade mould 70 relative to a longitudinal direction X is illustrated, whereas the ends for moulding the tip and root of the blade shell member is not illustrated. The blade mould 70 further comprises a spar cap region 73 extending along the longitudinal axis X of the blade mould. The spar cap region 73 is the region where the pre-manufactured spar cap 100 is to be arranged, i.e. the spar cap region 73 has the same length and width as the lower surface 102 of the pre-manufactured spar cap 100.

The blade mould 70 comprises a moulding surface 71 whereon the different materials for the blade shell member can be arranged. Furthermore, the blade mould 70 comprises a moulding cavity 72. The moulding cavity 72 is the space between the moulding surface 71 and a plane between which the different materials for the blade shell member may be arranged. The cavity 72 is illustrated in FIG. 5A.

FIG. 5A is a schematic diagram illustrating a cross-sectional view of the blade mould 70 of FIG. 4. The thick black lines illustrate substantially straight areas of the blade mould 70 between which a plane Y extends. The area between the plane Y and the moulding surface 71 is defined as the moulding cavity 72. FIG. 5A further illustrates the spar cap region 73, i.e. the region of the blade mould 70 where the spar cap 100 is to be arranged. The spar cap 100 is not to be arranged directly on the blade moulding surface 71 but in the area above the spar cap region 73 on the fibre-reinforced layers 80.

FIG. 5B is a schematic diagram illustrating an arrangement of a number of fibre-reinforced layers 80 on the blade moulding surface 71 of the blade mould 70. In FIG. 5B, three fibre-reinforced layers 80 are arranged on top of each other, forming a thin outer shell 81 of the blade shell member, as illustrated in FIG. 5C. In reality, the outer shell 81 is much thinner than illustrated in FIG. 5C. However, for illustrative purposes, the outer shell 81 proportions are exaggerated. Furthermore, in reality, more than three fibre-reinforced layers 80 may be arranged on top of each other, but for illustrative purpose, only three layers are shown.

FIG. 5C is a schematic diagram illustrating a first primer layer 10 applied on top of the fibre-reinforced layers 80 in the blade mould 70. The first primer layer 10 is illustrated as a thick black line for illustrative purposes. However, in reality, the first primer layer 10 is a very thin layer which may have a substantially constant or varying thickness at different areas of the spar cap region 73. The first primer layer may be applied outside the spar cap region 73, i.e, covering an area larger than the spar cap region, or may only cover some parts of the spar cap region 73.

FIGS. 5D-5F illustrate one embodiment of how to apply primer layers.

FIG. 5D is a schematic diagram illustrating providing a pre-manufactured spar cap 100 having an upper surface 101, a lower surface 102, a first side surface 103, a second side surface 104, a first end surface 105 and a second end surface 106. Only the first end surface of the spar cap 100 can be seen in FIG. 5D. The spar cap 100 is provided in a sling 91, such as illustrated in FIG. 4B. In the embodiment illustrated in FIG. 5D-5F, the pre-manufactured spar cap 100 does not comprise a primer layer before it is arranged in the spar cap region 73 of the blade mould 70 on top of the fibre-reinforced layers 80.

FIGS. 5E and 5F are schematic diagrams illustrating an arrangement of the pre-manufactured spar cap 100 at the spar cap region 73, such that the lower surface of the pre-manufactured spar cap 100 contacts the first primer layer 10 arranged at the spar cap region. Furthermore, a second primer layer 20 is applied to the upper surface 101 of the spar cap 100 and, a third and fourth primer layer 30, 40 are applied to the first and second side surfaces 103, 104 of the spar cap 100, respectively. It should be noted that it is not essential to add a third or fourth primer layer 30, 40 to the first and/or second side surface 103, 104. Furthermore, a fifth and sixth primer layer 50, 60 may be added to the first and second end surface of the spar cap; however again, this is not essential.

FIGS. 5G-5H illustrates another embodiment of applying primer to the pre-manufactured spar cap 100 and fibre-reinforced fibres 81 forming the outer shell 80 arranged in the blade mould 70 in accordance with the present invention.

FIG. 5G is a schematic diagram illustrating providing a pre-manufactured spar cap 100 having an upper surface 101, a lower surface 102, a first side surface 103, a second side surface 104, a first end surface 105 and a second end surface 106. Only a first end surface of the spar cap can be seen in FIG. 5G. The spar cap is provided in a sling 91, such as illustrated in FIG. 4B. In contrast to the embodiment illustrated in FIGS. 5D-5F, the pre-manufactured spar cap 100 comprises a second primer layer 20 on its upper surface 101 before it is arranged in the spar cap region 73 of the blade mould 70 on top of the fibre-reinforced layers 80 forming the outer shell 81.

FIG. 5H is a schematic diagram illustrating arranging the pre-manufactured spar cap 100 on the spar cap region 73, such that the lower surface 102 of the pre-manufactured spar cap 100 contacts the first primer layer 10 arranged at the spar cap region 73. In the embodiment illustrated in FIG. 5G-5H, no primer layers are applied to the side surfaces 103, 104 or end surfaces 105, 106. However, in other embodiments, a third and/or fourth primer layer 30, 40 may be added to the first and/or second side surfaces and/or a fifth and/or sixth primer layer 50, 60 may be added to the first and second end surface of the spar cap 100.

FIGS. 5I-5K illustrate how further elements 82, such as sandwich core layers and/or further fibre-reinforced layers 80, may be arranged within the cavity of the blade mould 70.

After arranging the desired elements within the cavity of the blade mould 70, the blade mould 70 can be infused with resin and cured to form a blade shell member. Infusion of the blade mould cavity with resin is preferably based on vacuum-assisted resin transfer moulding.

Again, it should be emphasised that the Figs. are schematic only and that in particular the thickness is exaggerated. Normally, the blade shell is much thinner, e.g. as shown in FIG. 2B.

FIGS. 5A-5K illustrate the manufacture of a pressure side shell part. It is recognised that a suction side shell part may be manufactured in a similar way. The two shell parts can subsequently be assembled to form a closed aerodynamic shell, e.g. with shear webs between the spar caps as illustrated in FIG. 2B.

LIST OF REFERENCE NUMERALS

10 First primer layer
20 Second primer layer
30 Third primer layer
40 Fourth primer layer
50 Fifth primer layer
60 Sixth primer layer
70 Blade mould
71 Moulding surface
72 Moulding cavity
73 Spar cap region
80 Fibre-reinforced layer
81 Outer shell of wind turbine shell member
82 Further elements, such as core elements and/or shear webs
90 Preparation table
91 Sling
92 Beam
100 Spar cap
101 Upper surface of spar cap
102 Lower surface of spar cap
103 First side surface of spar cap
104 Second side surface of spar cap
105 First end surface of spar cap
106 Second end surface of spar cap
110 First pultruded carbon element
111 First upper carbon surface
112 First lower carbon surface
120 Second pultruded carbon element
121 Second upper carbon surface
122 Second lower carbon surface
130 Interlayer
131 Upper interlayer surface
132 Lower interlayer surface
200 Wind turbine
400 Tower
600 Nacelle
800 Hub
1000 Blade
1400 Blade tip
1600 Blade root
1800 Leading edge
2000 Trailing edge
2200 Pitch axis
2400 Pressure side
2600 Suction side
3000 Root region
3200 Transition region 3400 Airfoil region
3800 Chord line
4000 Shoulder/position of maximum chord

The invention claimed is:

1. A method of manufacturing a blade shell member for a wind turbine blade, the method comprising the steps of:
providing a blade mould (70) for the blade shell member, the blade mould (70) comprising a moulding surface (71);
arranging a number of fibre-reinforced layers (80) on the blade moulding surface (71) in order to form an outer shell of the blade shell member;
applying a first primer layer (10) on top of the number of fibre-reinforced layers (80), at a pre-determined spar cap region (73);
providing a pre-manufactured spar cap (100) having an upper surface (101), a lower surface (102), a first side surface (103), a second side surface (104), a first end surface (105) and a second end surface (106);
arranging the pre-manufactured spar cap (100) on the spar cap region (73), such that the lower surface (102) of the pre-manufactured spar cap contacts the first primer layer (10) arranged on the spar cap region (73);
applying a second primer layer (20) to the upper surface (101) of the pre-manufactured spar cap (100);
arranging further fibre-reinforced layers on top of the pre-manufactured spar cap (100) in order to form an inner shell of the blade shell member;
arranging a vacuum bag and sealing it against the blade mould (70) in order to form a moulding cavity (72) with the number of fibre-reinforced layers (80), the pre-manufactured spar cap (100), and the further fibre-reinforced layers in the moulding cavity (72);
infusing the blade moulding cavity (72) with resin using vacuum assisted resin transfer moulding; and
curing the resin to form the blade shell member as a unitary structure.

2. The method according to claim 1, further comprising a step of applying a third primer layer (30) and/or a fourth primer layer (40) to the first side surface (103) and/or the second side surface (104), respectively, and wherein the step is performed after the step of arranging the pre-manufactured spar cap (100) on the spar cap region (73), but before the step of infusing the blade moulding cavity (72) with the resin.

3. The method according to claim 1, further comprising the step of applying a fifth primer layer (50) and/or sixth primer layer (60) to the first end surface (105) and/or the second end surface (106), respectively, wherein the step is performed after the step of arranging the pre-manufactured spar cap (100) on the spar cap region (73), but before the step of infusing the blade moulding cavity (72) with the resin.

4. The method according to claim 1, wherein the providing of the pre-manufactured spar cap (100) comprises the steps of:
providing a plurality of pultruded carbon elements (110, 120) and a number of interlayers (130) comprising fibre material for promoting resin flow between the pultruded carbon elements (110, 120);
arranging the plurality of pultruded carbon elements (110, 120) in a stacked array, wherein the plurality of pultruded carbon elements (110, 120) are separated by the number of interlayers (130); and
infusing the plurality of pultruded carbon elements (110, 120) with resin and curing to provide the pre-manufactured spar cap (100).

5. The method according to claim 1, wherein the pre-manufactured spar cap (100) is infused with vinyl ester or epoxy ester resin.

6. The method according to claim 1, wherein the step of arranging the number of fibre-reinforced layers (80) on the blade moulding surface (71) comprises arranging each of the number of fibre-reinforced layers (80) on top of each other.

7. The method according to claim 1, wherein the step of arranging the number of fibre-reinforced layers (80) on the blade moulding surface (71) comprises arranging a plurality of preforms, each comprising a consolidated stack of fibre-reinforced layers (80), on the moulding surface (71).

8. The method according to claim 1, wherein the number of fibre-reinforced layers (80) comprises glass fibres and/or carbon fibres.

9. The method according to claim 1, wherein the number of fibre-reinforced layers (80) comprises unidirectional layers and/or biaxial layers and/or triaxial layers.

10. The method according to claim 1, wherein the blade mould cavity (73) is infused with polyester resin.

11. The method according to claim 1, wherein the first primer layer (10) is applied on the entire spar cap region (73).

12. The method according to claim 1, wherein the first primer layer (10) is applied on one or more areas of the spar cap region (73), but not the entire spar cap region (73).

13. The method according to claim 1, wherein at least one of the first, second, third, fourth, fifth and sixth primer layer (10,20,30,40,50,60) is applied by brushing and/or rolling and/or spraying.

14. The method according to claim 1, wherein at least one of the first, second, third, fourth, fifth and sixth primer layer (10,20,30,40,50,60) is applied using a spray gun.

15. The method according to claim 1, wherein the method further comprises the step of arranging further elements (82) in the blade mould (70) before the step of infusing the blade moulding cavity (72) with the resin.

16. The method according to claim 13, wherein all of the first, second, third, fourth, fifth and sixth primer layer (10,20,30,40,50,60) are applied by brushing and/or rolling and/or spraying.

17. The method according to claim 14, wherein all of the first, second, third, fourth, fifth and sixth primer layer (10,20,30,40,50,60) are applied using the spray gun.

18. The method according to claim 15, wherein the further elements (82) comprise sandwich core layers and/or further fibre-reinforced layers (80).

19. A method of manufacturing a wind turbine blade, comprising the steps of manufacturing a pressure side shell half and a suction side shell half over substantially the entire length of the wind turbine blade in accordance with claim 1 and subsequently closing and joining the shell halves for obtaining a closed shell.

20. A method of manufacturing a blade shell member for a wind turbine blade, the method comprising the steps of:
providing a blade mould (70) for the blade shell member, the blade mould (70) comprising a moulding surface (71);
arranging a number of fibre-reinforced layers (80) on the blade moulding surface (71) in order to form an outer shell of the blade shell member;
applying a first primer layer (10) on top of the number of fibre-reinforced layers (80), at a pre-determined spar cap region (73);
providing a pre-manufactured spar cap (100) having an upper surface (101), a lower surface (102), a first side surface (103), a second side surface (104), a first end surface (105) and a second end surface (106);

arranging the pre-manufactured spar cap (100) on the spar cap region (73), such that the lower surface (102) of the pre-manufactured spar cap contacts the first primer layer (10) arranged on the spar cap region (73);

applying a second primer layer (20) to the upper surface (101) of the pre-manufactured spar cap (100);

arranging further fibre-reinforced layers on top of the pre-manufactured spar cap (100) in order to form an inner shell of the blade shell member;

arranging a vacuum bag and sealing it against the blade mould (70) in order to form a moulding cavity (72) with the number of fibre-reinforced layers (80), the pre-manufactured spar cap (100), and the further fibre-reinforced layers in the moulding cavity (72);

infusing the blade moulding cavity (72) with resin using assisted resin transfer moulding; and curing the resin to form the blade shell member as a unitary structure, wherein the providing of the pre-manufactured spar cap (100) comprises the steps of:

providing a plurality of pultruded carbon elements (110, 120) and a number of interlayers (130) comprising fibre material for promoting resin flow between the pultruded carbon elements (110, 120);

arranging the plurality of pultruded carbon elements (110, 120) in a stacked array, wherein the plurality of pultruded carbon elements (110, 120) are separated by the number of interlayers (130); and infusing the plurality of pultruded carbon elements (110, 120) with resin and curing to provide the pre-manufactured spar cap (100).

\* \* \* \* \*